United States Patent Office 3,148,871
Patented Sept. 15, 1964

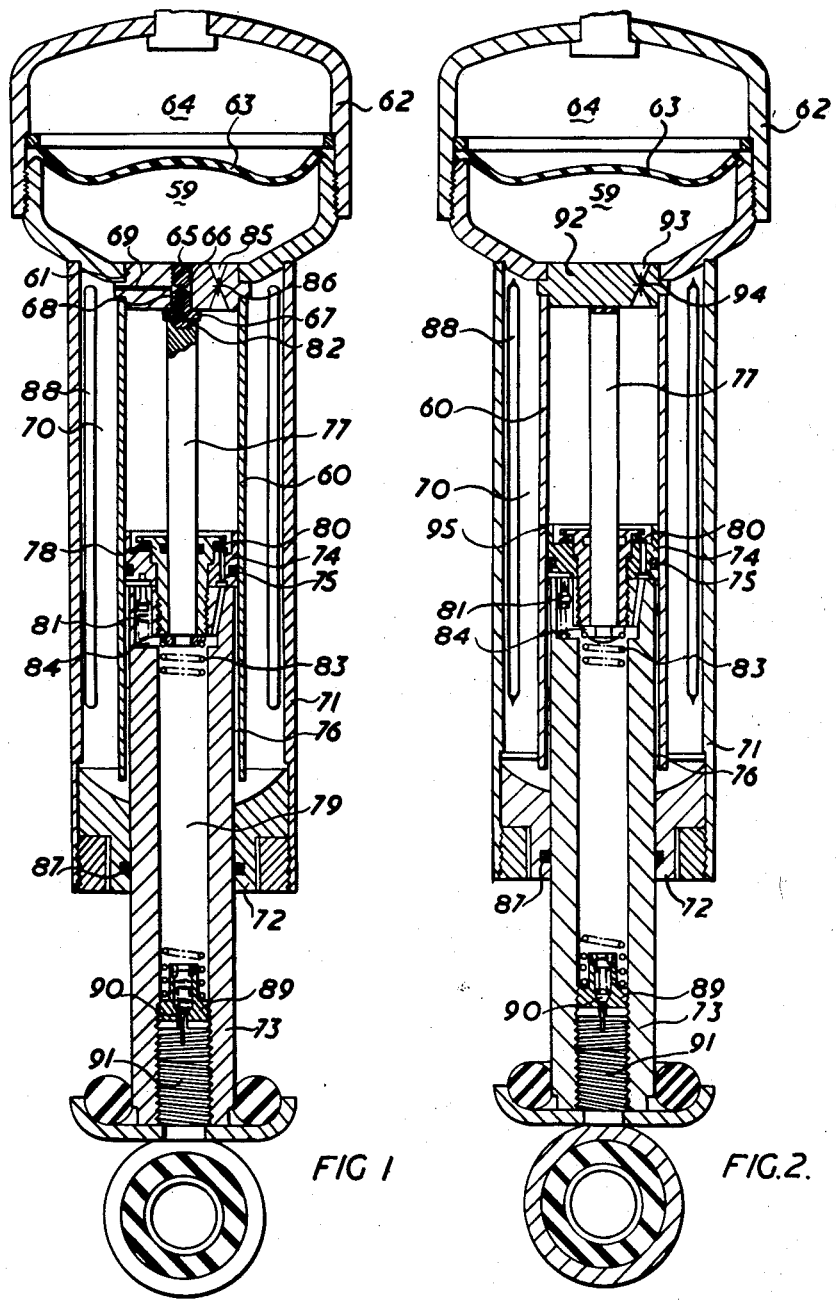

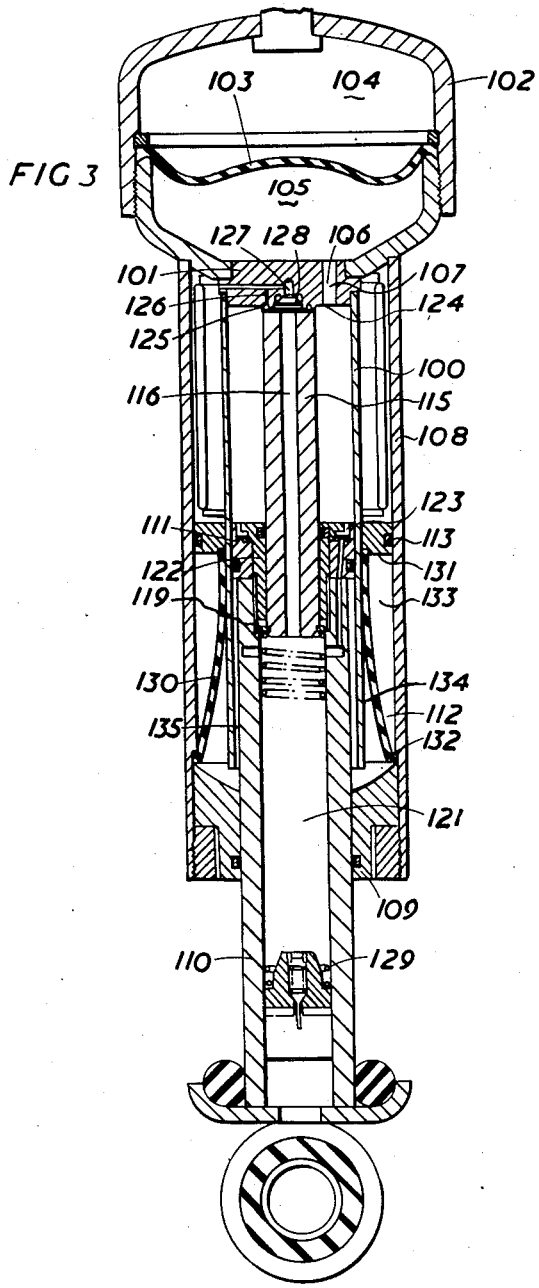

1

3,148,871
HYDRO-PNEUMATIC SUSPENSION UNITS
FOR VEHICLES
Douglas Bryan Wilkins, Solihull, and Eric David Hopkins, Birmingham, England, assignors to Girling Limited, Birmingham, England, a British company
Filed Dec. 11, 1963, Ser. No. 329,753
Claims priority, application Great Britain, Feb. 27, 1963, 7,806/63; Apr. 18, 1963, 15,250/63; June 15, 1963, 23,931/63
15 Claims. (Cl. 267—64)

This invention relates to improvements in hydro-pneumatic suspension units for vehicles of the kind adapted to act as self-levelling pneumatic springs.

In such units relative axial movement between a piston and a cylinder which are connected between sprung and unsprung parts of a vehicle causes liquid to be drawn from a reservoir and pumped into a chamber containing a volume of air or other gas under pressure, the air or other gas forming a pneumatic spring. The transfer of liquid from the reservoir to the pressure chamber increases the effective length of the unit, and the sprung part of the vehicle, which is usually the vehicle body, is raised to a level at which it is maintained by allowing liquid to return from the pressure chamber to the reservoir when that level is reached.

According to our invention, in an hydro-pneumatic suspension unit of the kind set forth liquid is drawn from the reservoir and pumped into the pressure chamber by a floating axial rod working in an axial bore in the piston rod which provides a pumping space into which liquid is drawn on extension of the unit and from which it is forced into the pressure chamber on compression of the unit.

The axial rod is conveniently urged upwardly by a compression spring housed in the hollow piston rod, the upper end of the spring abutting against a collar which is fixed on the lower end of the axial rod and is of greater diameter than the axial rod to form a stop limiting the movement of the axial rod out of the piston rod.

Several embodiments of our invention are illustrated by way of example in the accompanying drawings in which:

FIGURE 1 is a longitudinal section of a suspension unit for a vehicle;

FIGURE 2 is a longitudinal section of a modified form of the suspension unit shown in FIGURE 1; and FIGURE 3 is a longitudinal section of a further modified form of the suspension unit shown in FIGURE 1.

In the unit shown in FIGURE 1, a working cylinder 60 open at its lower end is secured at its upper end to a closure 61 for an opening in the lower end of a pressure chamber 62 divided by a diaphragm 63, the space 64 above the diaphragm being filled with air or other gas under pressure and the space 59 below the diaphragm being filled with liquid. A plug 65 screwed or otherwise secured into an axial bore 66 in the closure has on its lower end an annular seating 67 around an axial passage 68 extending upwardly to meet a radial port 69 in the closure leading into the upper end of a reservoir 70 formed by the annular space between the working cylinder 60 and a concentric outer shell 71.

The outer shell 71 is welded or otherwise secured at its upper end to the pressure chamber 62, and its lower end is closed by a bush or equivalent member 72 through which works a piston rod 73 carrying a piston 74 working in the working cylinder 60, the piston incorporating an O-ring or other seal 75. The working cylinder 60 is a press fit at its lower end in the bush in which is milled a pair of slots so that an annular clearance 76 around

2 the piston rod and below the piston is in open communication with the reservoir.

The piston rod 73 is hollow and the lower end of an axial rod 77 slidably guided in a bushing 78 mounted in the piston 74 extends into the bore 79 of the piston rod, the diameter of the rod being less than that of the bore. The upper end of the bore communicates through a one-way valve 80 in the piston with the cylinder above the piston and through a second one-way valve 81 in the wall of the piston rod with the clearance 76 around the piston rod.

The upper end of the axial rod 77 is recessed to receive a washer 82 adapted to engage the seating 67 in the closure for the upper end of the working cylinder 60 and closes the passage 68 leading to the reservoir 70.

The axial rod 77 is urged upwardly to hold it in engagement with the seating by a compression spring 83 housed in the bore 79 of the piston rod, the upper end of the spring abutting a collar 84 which is fixed on the lower end of the axial rod 77 and is of greater diameter than the rod.

The upper end of the working cylinder 60 communicates with the liquid space 59 in the pressure chamber 62 through offset passages 85 in the closure controlled by oppositely acting one-way valves or by restrictors 86 which allow liquid to pass between the chamber and the cylinder in both directions but provide a certain amount of damping.

The unit is adapted to be connected in the usual way between sprung and unsprung parts of a vehicle, and when the vehicle is travelling, suspension movements produce contraction and expansion of the unit.

On contraction of the unit the axial rod 77 moves into the bore 79 in the piston rod and displaces liquid from it through the one-way valve 80 in the piston 74 and so into the liquid space 59 in the pressure chamber.

On expansion of the unit the axial rod 77 moves upwardly relative to the piston and liquid is drawn from the reservoir 70 through the annular space 76 around the piston rod and through the one-way valve 81 into the bore 79 of the piston rod.

Liquid is thus pumped from the reservoir 70 into the pressure chamber 62 and the axial length of the unit increases until the collar 84 on the lower end of the axial rod 77 engages the lower end of the bush 78 in the piston through which it works. On any further extension of the unit the rod is retracted from the valve seat 67 on the closure 61 for the upper end of the working cylinder and liquid is allowed to return from the pressure end of the cylinder to the reservoir 70.

If the loading of the vehicle is increased the unit is contracted and the upper end of the axial rod 77 engages its seating and pumping is resumed, the pumping continuing until the unit has returned to its predetermined axial length. It will be appreciated that in this arrangement a seal 87 provided for the piston rod where it works through the bush 72 closing the lower end of the reservoir is only subjected to the pressure in the reservoir.

The reservoir is preferably partially occupied by a longitudinally fluted bag 88 containing air or other gas to take care of fluctuations in the volume of liquid in the reservoir.

The outer end of the piston rod 73 may house within its bore 79 a fitting 89 containing a one-way valve 90 through which the unit can be charged with liquid after removal of a plug 91 closing the end of the bore.

FIGURE 2 shows a modification of the suspension unit shown in FIGURE 1 and corresponding numerals have been used to indicate corresponding parts. In this arrangement the working cylinder is secured at its upper end to a solid closure 92 and the upper end of the working cylinder 60 communicates with the liquid space 59 in the pressure chamber 62 through offset passages 93 in the closure 92 controlled by oppositely acting one-way valves or restrictors 94 which allow liquid to pass between the chamber and the cylinder in both directions but provide a certain amount of damping.

The operation of this embodiment is substantially the same as the operation of the embodiment hereinbefore described with reference to FIGURE 1 with the exception that when the unit is connected in the usual way between sprung and unsprung parts of a vehicle and when the unit is contracted, the upper end of the rod 77 is engaged by the closure and forced into the bore 79 in the piston rod to displace liquid from it. The effective length of the unit is extended due to suspension movements until the piston 74 uncovers a port 95 in the wall of the working cylinder 60 through which liquid can return from the pressure space above the piston to the reservoir 70 and no further extension of the unit takes place unless the loading of the vehicle is increased.

In a modified form of suspension unit shown in FIGURE 3 there is secured in the upper end of a working cylinder 100 a plug 101 to which is secured a pressure and a lower liquid chamber 105 in communication with the upper end of the cylinder through a passage or passages 106 in the plug controlled by a valve or valves 107 providing damping of the flow of liquid in both directions between the cylinder and the pressure chamber.

The working cylinder 100 is enclosed within a concentric outer cylindrical shell 108 of which the upper end is secured to the pressure chamber and the lower end is closed by a closure member 109 through which works a hollow piston rod 110 carrying at its upper end a piston 111 working in the working cylinder 100.

An annular space 112 formed between the working cylinder 100 and the outer shell 108 is divided into two spaces by a stationary ring 113, the space above the ring forming a reservoir which is filled with liquid and may contain a flexible bag 114 filled with air or gas.

An axial rod 115 having an axial bore 116 is slidably guided at its lower end in a fitting 122 in the piston 111, the lower end of the bore 116 in the rod 115 opening into the bore 121 of the piston rod which is in communication with the cylinder above the piston through a one-way valve 123 in the piston. The upper end of the rod 115 co-operates with a central seating 124 comprising two annular seats on the underside of the plug 101 at the upper end of the working cylinder 100, the space 125 within the seating being connected to the reservoir through a bleed passage 126. A central passage 127 controlled by a one-way valve 128 also provides communication between the reservoir and the cylinder 100.

On extension of the unit when under pressure the pressure within the bore 121 of the piston rod 110 is reduced and liquid is drawn from the reservoir through the bore 116 in the axial rod 115 and the one-way valve 128 in the plug 107. On contraction of the unit the axial rod 115 moves into the bore 121 of the piston rod and forces liquid through the one-way valve 123 in the piston into the upper part of the cylinder 100 and so into the pressure chamber.

Normally the upper end of the axial rod 115 is resiliently held by a compression spring 129 in the bore 121 of the piston rod in engagement with the seating 124 on the plug at the upper end of the cylinder so that the passage 127 leading to the reservoir is closed, but when the unit has been extended to a predetermined length the rod 115 is withdrawn from the seating by a circlip 119 retained in an annular recess in the lower end of the axial rod abutting against the lower end of the fitting 122 so that the bleed passage 126 is opened to allow liquid to return from the upper end of the cylinder to the reservoir and no further extension of the unit takes place.

The portion of the annular space 112 between the working cylinder 100 and the outer shell 108 and below the stationary ring 113 is in communication with the lower end of the working cylinder by way of a pair of milled slots in the bottom closure of the outer shell, and this space is divided by an axially extending diaphragm 130 of sleeve form. The upper end of the diaphragm 130 is secured in an annular recess 131 in the bottom of the ring at its inner edge and the lower end is secured in an annular groove 132 in the inner surface of the outer shell adjacent to the upper end of the bottom of the closure member 109. The space 133 on the outer side of the diaphragm between it and the outer cylinder is filled with air or other gas under pressure, and the space 134 on the inner side which is continuous with annular space 135 between the piston rod 110 and the working cylinder 100 below the piston is filled with liquid on which a pressure is maintained by the air or gas on the outer side of the diaphragm.

When the unit is extended the working cylinder 100 moves upwardly relative to the piston so that the space below the piston is reduced and the pressure of the liquid acting on the underside of the piston increases and produces a snubbing effect.

The additional air spring is housed within the length of the outer shell 108 so that its presence does not add to the overall length of the unit though a slight increase in the diameter of the outer shell may be necessary.

Another advantage of the additional air spring is that it makes the unit less sensitive to temperature changes as the normal increase in the downward pressure acting on the piston which is caused by an increase in working or ambient temperature is counteracted by a corresponding increase in the pressure acting on the underside of the piston and produced by the additional air spring.

We claim:
1. An hydro-pneumatic suspension unit for a vehicle adapted to act as a self-levelling strut, comprising a cylinder, a pressure chamber communicating with a first end of said cylinder and containing a liquid and a gas, a reservoir for liquid, a piston working in the cylinder, a piston rod carrying said piston, an axial bore in the piston rod defining a pumping space, a freely axially movable axial rod working in said axial bore, whereby on extension of the unit liquid is drawn by said axial rod from said reservoir into said pumping space and on contraction of the unit liquid is forced by said axial rod from said pumping space into said pressure chamber.

2. An hydro-pneumatic suspension unit for a vehicle adapted to act as a self-levelling strut, comprising a cylinder, a reservoir for liquid, a pressure chamber communicating with a first end of said cylinder and containing liquid and a gas, a piston working in said cylinder, a piston rod carrying said piston, an axial bore in said piston rod defining a pumping space, a first one-way valve connecting said reservoir with said pumping space, a second one-way valve connecting said pumping space with the first end of the cylinder, a freely axially movable axial rod slidably guided in said piston and working in the axial bore in said piston rod, whereby on extension of the unit liquid is pumped by said axial rod from said reservoir past said first one-way valve and into said pumping space and on contraction of the unit liquid is forced by said axial rod from said pumping space, past said second one-way valve and into said pressure chamber.

3. An hydro-pneumatic suspension unit as claimed in claim 2, in which a bushing is located in the piston and has an axial bore in which the axial rod is slidably guided.

4. An hydro-pneumatic suspension unit for a vehicle adapted to act as a self levelling strut, comprising a cylinder, a pressure chamber communicating with a first end of said cylinder and containing a liquid and a gas, a reservoir for liquid, a piston working in the cylinder, a piston-rod of less diameter than the cylinder, a closure for a second end of said cylinder through which said piston-rod works, the piston and end closure defining the ends of an annular space of variable axial length between the piston rod and the cylinder, means providing communication between said reservoir and the lower end of said annular space, an axial bore in the piston rod defining a pumping space, a first one-way valve connecting said annular space with said pumping space, a second one-way valve connecting said pumping space with the first end of the cylinder, a floating axial rod slidably guided in said piston and working in the axial bore in said piston rod, whereby on extension of the unit liquid is pumped by said axial rod from said reservoir through said annular space between the piston rod and the cylinder, past said first one-way valve and into said pumping space and on contraction of the unit liquid is forced by said axial rod from said pumping space, past said second one-way valve and into said pressure chamber.

5. An hydro-pneumatic suspension unit as claimed in claim 4, in which said first one-way valve is located in the wall of the piston rod.

6. An hydro-pneumatic suspension unit as claimed in claim 4, in which the closure for the second end of the cylinder incorporates a seal through which the piston rod works and which is subjected to the pressure in the reservoir.

7. An hydro-pneumatic suspension unit for a vehicle adapted to act as a self levelling strut, comprising a cylinder, a cylindrical outer shell, an annular chamber between the cylinder and the outer shell defining a reservoir for liquid, a pressure chamber at a first end of said cylinder, a closure for the first end of said cylinder, means in said closure for providing communication between said pressure chamber and the first end of said cylinder and containing a liquid and a gas, a piston working in the cylinder, a piston rod carrying said piston, an axial bore in said piston rod defining a pumping space, a floating axial rod working in said axial bore in said piston rod, an axial bore in said axial rod a first one-way valve located in the closure for the first end of the cylinder and connecting the reservoir with the pumping space through the axial bore in said axial rod, a second one-way valve connecting said pumping space with the first end of the cylinder, whereby on extension of the unit liquid is pumped by said axial rod from said reservoir past said first one-way valve and through said axial bore in said axial rod and into said pumping space and on contraction of the unit liquid is forced by said axial rod from said pumping space, past second one-way valve and into said pressure chamber.

8. An hydro-pneumatic suspension unit as claimed in claim 7, in which said first one-way valve is located in an axial recess in the closure for the first end of the cylinder and communicates through a radial port in said closure with said reservoir.

9. An hydro-pneumatic suspension unit for a vehicle adapted to act as a self levelling strut, comprising a cylinder, a cylindrical outer shell, an annular chamber between the cylinder and the outer shell, a stationary annular ring dividing said annular chamber into two annular spaces, the annular space above the annular ring defining a reservoir for liquid, a diaphragm of sleeve form dividing the annular space below the annular ring into two compartments of which the compartment on the outer side of the diaphragm between it and the outer shell is filled with gas under pressure, a pressure chamber communicating with a first end of the cylinder and containing a liquid and a gas, a piston working in the cylinder, a piston-rod of less diameter than the cylinder, a closure for the second end of the cylinder and the outer shell through which said piston rod works, the piston and end closure defining the ends of an annular space of variable axial length between the piston rod and the cylinder for liquid, means providing communication between the lower end of said annular space and the compartment on the inner side of the diaphragm between it and the cylinder, an axial bore in the piston rod defining a pumping space, a floating axial rod working in said axial bore, whereby on extension of the unit liquid is drawn by said axial rod from said reservoir into said pumping space and the annular space between the piston rod and the cylinder decreases in length and liquid is forced from said annular space into the compartment on the inner side of the diaphragm between it and the cylinder and exerts an increasing pressure on the underside of the piston thus producing a snubbing action, and on contraction of the unit liquid is forced by axial rod from pumping space into said pressure chamber.

10. An hydro-pneumatic suspension unit as claimed in claim 9, in which the stationary annular ring dividing said annular chamber between the cylinder and the outer shell has in its lower face and at its inner edge an annular recess, and an annular groove is formed in the upper face of the closure for the second end of the cylinder and the outer shell through which said piston rod works, said axially extending diaphragm being secured at its upper edge in said recess and at its lower edge in said groove.

11. An hydro-pneumatic suspension unit for a vehicle adapted to act as a self levelling strut, comprising a cylinder, a cylindrical outer shell, an annular chamber between the cylinder and the outer shell, a stationary annular ring dividing said chamber into two annular spaces, the annular space above the annular ring defining a reservoir for liquid, an axially extending diaphragm of sleeve form dividing the annular space below the annular ring into two compartments of which the compartment on the outer side of the diaphragm between it and the outer shell is filled with gas under pressure, a pressure chamber at a first end of said cylinder, a closure for the first end of said cylinder, means in said closure for providing communication between said pressure chamber and the first end of said cylinder, a piston working in the cylinder, a piston rod of less diameter than the cylinder, a closure for the second end of the cylinder and the outer shell through which said piston rod works, the piston and end closure defining the ends of an annular space of variable axial length between the piston rod and the cylinder for liquid, means providing communication between the lower end of said annular space and the compartment on the inner side of the diaphragm between it and the cylinder, an axial bore in said piston rod defining a pumping space, a floating axial rod working in said axial bore in said piston rod, an axial bore in said axial rod, a first one-way valve located in the closure for the first end of said cylinder and connecting the reservoir with the pumping space through the axial bore in said axial rod, a second one-way valve connecting said pumping space in said piston rod with the said first end of said cylinder, whereby on extension of the unit liquid is pumped by said axial rod from said reservoir past said first one-way valve and through said axial bore in said axial rod and into said pumping space and the annular space between the piston rod and the cylinder decreases in length and liquid is forced into the compartment on the inner side of the diaphragm between it and the cylinder and exerts an increasing pressure on the underside of the piston thus producing a snubbing action, and on contraction of the unit liquid is forced by said axial rod from said pumping space, past said second one-way valve and into said pressure chamber.

12. An hydro-pneumatic suspension unit for a vehicle adapted to act as a self-levelling strut, comprising a cylinder, a reservoir for liquid, a pressure chamber communicating with a first end of said cylinder and containing liquid and a gas, a piston working in said cylinder, a piston rod carrying said piston, an axial bore in said piston rod defining a pumping space, a first one-way valve connecting said reservoir with said pumping space, a second one-way valve connecting said pumping space with the first end of the cylinder, a freely axially movable rod slidably guided in said piston and working in the axial bore in said piston rod, a collar fixed on the lower end of said axial rod and of greater diameter than the rod for forming a stop limiting movement of said axial rod out of said piston rod, and a compression spring housed within the axial bore in said piston rod and abutting at its upper end against the collar for urging said axial rod upwardly, whereby on extension of the unit liquid is pumped by said axial rod from said reservoir past said first one-way valve and into said pumping space and on contraction of the unit liquid is forced by said axial rod from said pumping space, past said second one-way valve and into said pressure chamber.

13. An hydro-pneumatic suspension unit for a vehicle adapted to act as a self-levelling strut, comprising a cylinder, an annular chamber surrounding the cylinder and forming a reservoir for liquid, at least one flexible bag containing gas located in the reservoir, a pressure chamber communicating with a first end of said cylinder and containing liquid and a gas, a piston working in said cylinder, a piston rod carrying said piston, and axial bore in said piston rod defining a pumping space, a first one-way valve connecting said reservoir with said pumping space, a second one-way valve connecting said pumping space with the first end of the cylinder, a freely axially movable rod slidably guided in said piston and working in the axial bore in said piston rod, whereby on extension of the unit liquid is pumped by said axial rod from said reservoir past said first one-way valve and into said pumping space and on contraction of the unit liquid is forced by said axial rod from said pumping space, past said second one-way valve and into said pressure chamber.

14. An hydro-pneumatic suspension unit for a vehicle adapted to act as a self-levelling strut, comprising a cylinder, a pressure chamber communicating with a first end of said cylinder and containing a liquid and a gas, a reservoir for liquid, a piston working in the cylinder, a piston rod carrying said piston, an axial bore in the piston rod defining a pumping space, an axial rod freely axially movable relative to the piston rod into and out of said axial bore during movements of the piston rod in a predetermined range to force liquid into said pressure chamber and to draw liquid from said reservoir, respectively, said rod moving with the piston rod during movements of the piston rod outside said predetermined range.

15. An hydro-pneumatic suspension unit for a vehicle adapted to act as a self-levelling strut, comprising a cylinder, a pressure chamber communicating with a first end of said cylinder and containing a liquid and a gas, a reservoir for liquid, a piston working in the cylinder, a piston rod carrying said piston, an axial bore in the piston rod defining a pumping space, an axial rod freely axially movable in said axial bore, whereby on extension of said unit and relative movement between said axial rod and said piston rod, liquid is drawn from said reservoir and pumped into said pumping space and on contraction of the unit and relative movement between said axial rod and said piston rod in the opposite direction liquid is pumped from said pumping space into said pressure chamber.

References Cited in the file of this patent

UNITED STATES PATENTS

| | | |
|---|---|---|
| 1,146,335 | Lieban | July 13, 1915 |
| 2,802,664 | Jackson | Apr. 13, 1957 |
| 2,946,582 | Martin | July 26, 1960 |
| 3,024,875 | Stultz | May 13, 1962 |
| 3,041,062 | Bliven | June 26, 1962 |